(12) United States Patent
Wada

(10) Patent No.: US 11,001,259 B2
(45) Date of Patent: May 11, 2021

(54) TRANSPORT SYSTEM

(71) Applicant: Daifuku Co., Ltd., Osaka (JP)

(72) Inventor: Yoshinari Wada, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 113 days.

(21) Appl. No.: 16/121,999

(22) Filed: Sep. 5, 2018

(65) Prior Publication Data
US 2019/0071085 A1 Mar. 7, 2019

(30) Foreign Application Priority Data
Sep. 7, 2017 (JP) .............................. JP2017-172235

(51) Int. Cl.
*B60W 30/165* (2020.01)
*B60W 30/14* (2006.01)
*G08G 1/00* (2006.01)
*B60W 30/18* (2012.01)

(52) U.S. Cl.
CPC ........ *B60W 30/165* (2013.01); *B60W 30/143* (2013.01); *G08G 1/22* (2013.01); *B60W 30/18163* (2013.01); *B60W 2554/80* (2020.02); *B60W 2556/65* (2020.02)

(58) Field of Classification Search
CPC .................................................. B60W 30/165
See application file for complete search history.

(56) References Cited

U.S. PATENT DOCUMENTS

| 8,027,755 | B2 | 9/2011 | Ohta | |
|---|---|---|---|---|
| 9,940,840 | B1* | 4/2018 | Schubert | .................. B61B 3/00 |
| 2005/0247231 | A1* | 11/2005 | Fischer | .................. B61L 23/00 104/3 |
| 2010/0138082 | A1 | 6/2010 | Ohta | |
| 2017/0072957 | A1 | 3/2017 | Nemoto | |
| 2018/0082590 | A1* | 3/2018 | MacNeille | ....... G08G 1/096791 |
| 2019/0196500 | A1* | 6/2019 | Harasaki | .............. G05D 1/0287 |
| 2020/0004269 | A1* | 1/2020 | Oba | ................... G08G 1/09675 |

FOREIGN PATENT DOCUMENTS

| JP | H11129901 A | 5/1999 |
|---|---|---|
| JP | 2007025745 A | 2/2007 |
| JP | 2010134537 A | 6/2010 |
| JP | 2016128997 A | 7/2016 |
| JP | 201758891 A | 3/2017 |

* cited by examiner

*Primary Examiner* — Imran K Mustafa
(74) *Attorney, Agent, or Firm* — The Webb Law Firm

(57) ABSTRACT

Each transport vehicle is configured to perform a vehicle following control if an inter-vehicle distance to the transport vehicle traveling ahead becomes less than or equal to a predetermined distance, the vehicle following control being a control in which traveling state of the own transport vehicle is controlled in order to maintain constant the inter-vehicle distance to the transport vehicle traveling ahead based on traveling state information of the transport vehicle traveling ahead. Each transport vehicle is configured to terminate the vehicle following control if preparation of the own transport vehicle for arrival at a destination is initiated while the vehicle following control is being performed or if a travel direction of the own transport vehicle at a branching location is determined to be different from a travel direction of the transport vehicle traveling ahead at the branching location while the vehicle following control is being performed.

8 Claims, 5 Drawing Sheets

TRANSPORT SYSTEM

CROSS-REFERENCE TO RELATED APPLICATION

This application claims priority to Japanese Patent Application No. 2017-172235 filed Sep. 7, 2017, the disclosure of which is hereby incorporated in its entirety by reference.

FIELD OF THE INVENTION

The present invention relates to a transport system comprising a plurality of transport vehicles.

BACKGROUND ART

JP Publication of Application No. 2017-58891, for example, discloses a technology related to a vehicle following control for causing a vehicle to follow a vehicle traveling ahead. This technology assumes that the cars are operated by human drivers, as in the case of passenger cars. For this reason, in order to take into consideration a wish of a driver of the vehicle traveling ahead, this system is configured to allow disengagement of the vehicle following control for following the vehicle traveling ahead when the driver of the vehicle traveling ahead does not wish to be followed.

SUMMARY OF THE INVENTION

Incidentally, such vehicle following control technology can be used also in, for example, transport systems in which a plurality of transport vehicles travel along preinstalled transporting paths to transport articles. However, since there are no human drivers operating the vehicles in such transport systems, there is no need to take a driver's wish into consideration. Instead, a greater transport efficiency of the system as a whole is desired in such systems. However, there is no statement in the aforementioned publication about any problems specific to such transport systems or means for solving such problems.

In light of the above, technology is desired which can improve transport efficiency of a transport system as a whole that includes a plurality of transport vehicles that travel along travel paths.

In one embodiment, a transport system comprises: a plurality of transport vehicles configured to travel along one or more transport paths which include one or more branching locations and one or more merging locations, wherein each of the plurality of transport vehicles is configured to:
  travel along at least one of the one or more transport paths toward a designated destination;
  transmit traveling state information of own transport vehicle to a transport vehicle that is traveling behind the own transport vehicle and to receive traveling state information of a transport vehicle that is traveling ahead of the own transport vehicle, from the transport vehicle traveling ahead;
  perform a vehicle following control if an inter-vehicle distance to the transport vehicle traveling ahead of the own transport vehicle becomes less than or equal to a predetermined distance, the vehicle following control being a control in which traveling state of the own transport vehicle is controlled in order to maintain constant the inter-vehicle distance to the transport vehicle traveling ahead based on traveling state information of the transport vehicle traveling ahead, and
  terminate the vehicle following control
    if preparation of the own transport vehicle for arrival at a destination is initiated while the vehicle following control is being performed or
    if a travel direction of the own transport vehicle at a branching location is determined to be different from a travel direction of the transport vehicle traveling ahead at the branching location while the vehicle following control is being performed.

With such an arrangement, because each transport vehicle performs the vehicle following control based on the traveling state information received from the transport vehicle traveling ahead, it can follow the transport vehicle traveling ahead with a relatively small amount of control delay. Thus, the inter-vehicle distance to the transport vehicle traveling ahead can be made shorter than normal while avoiding any contact with the transport vehicle traveling ahead, thus making it possible to improve transport efficiency of the transport system as a whole. In addition, with the arrangement described above, each transport vehicle is configured to perform a vehicle following control if an inter-vehicle distance to the transport vehicle traveling ahead of the own transport vehicle becomes less than or equal to a predetermined distance, and to terminate the vehicle following control if preparation of the own transport vehicle for arrival at its own destination is initiated or if a travel direction of the own transport vehicle at a branching location is different from a travel direction of the transport vehicle traveling ahead at the branching location. Therefore, with the arrangement described above, autonomous traveling of each transport vehicle is allowed to efficiently transport an article, however, when a transport vehicle comes close to a transport vehicle traveling ahead in a travel direction, the inter-vehicle distance is maintained relatively short by performing the vehicle following control, which makes it possible to improve transport efficiency in situations where a plurality of transport vehicles are allowed to travel along the same path. Thus, such an arrangement makes it possible to improve transport efficiency of the transport system as a whole while avoiding a transport vehicle making any contact with a transport vehicle traveling ahead.

Additional features and advantages of the technology related to the present disclosure will be made clear by the following description of various non-limiting example embodiments of the present disclosure described with reference to the attached drawings.

DETAILED DESCRIPTION OF EMBODIMENTS

1. First Embodiment

1-1. Mechanical Arrangement of Transport System

Figure 1:
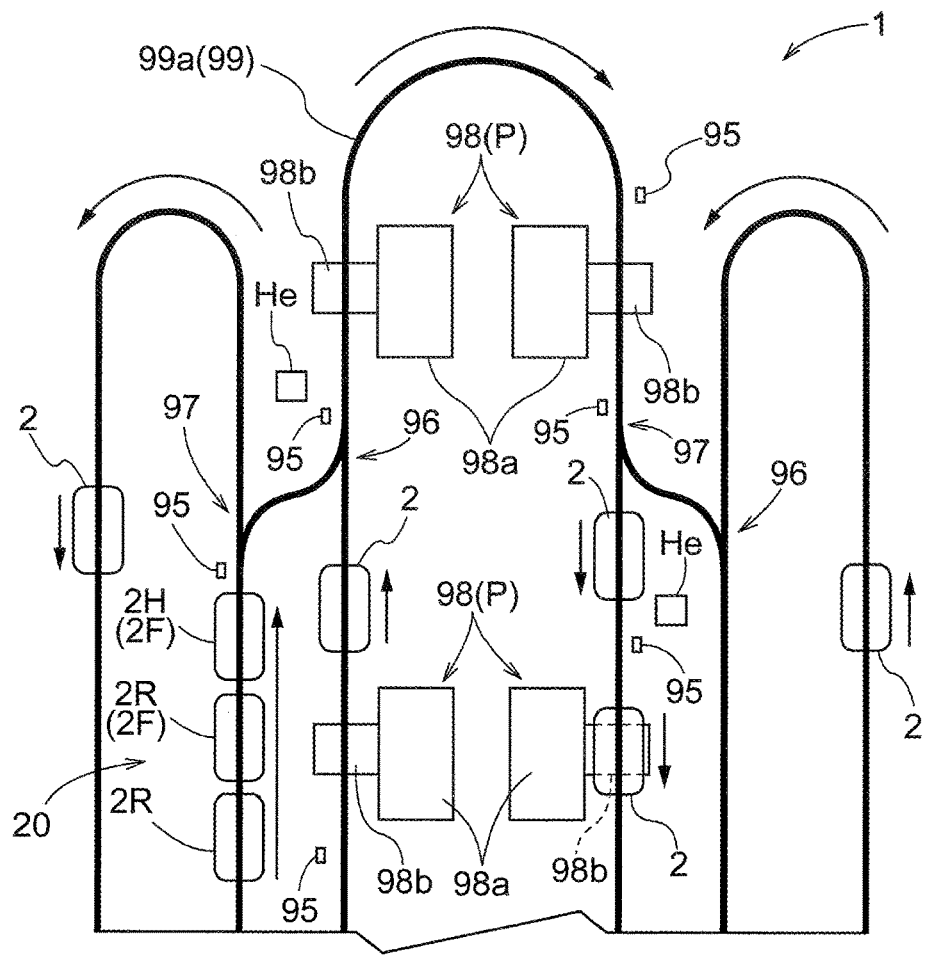
FIG. 1 is a plan view of a transport system.

An embodiment of a transport system is described with reference to FIGS. 1 and 2. The transport system 1 includes a plurality of transport vehicles 2 configured to travel along transporting paths 99 which include, among other locations, branching locations 97 and merging locations 96. And each of the plurality of transport vehicles 2 travels along one or more transporting paths 99 toward a designated destination P. For example, a transport vehicle 2 may transport an article W to a transport target location 98 as a destination P. In the present embodiment, each article W is a container for holding one or more semiconductor substrates. In addition, provided at each transport target location 98 are a processing device 98a for processing semiconductor substrates, and a transfer location 98b to and from which articles W are transferred by the transport vehicles 2. In the present example, a plurality of such transport target locations 98 are located along a transporting path 99.

The transporting paths 99 are formed to include straight path portions and curved path portions. And the transporting paths 99 include branching locations 97 and merging locations 96. The transporting paths 99 may include, for example, intra-process paths and inter-process paths. In such a case, a plurality of transport target locations 98 may be connected by an intra-process path while a plurality of such intra-process paths may be connected to each other by inter-process paths.

In the present embodiment, each transport vehicle 2 is a ceiling, or overhead, transport vehicle configured to travel along rails 99a provided parallel to the ceiling surface. The rails 99a are provided along the transporting path 99 which extends by way of a plurality of transport target locations 98. Each transport vehicle 2 is capable of transporting articles W, one at a time, to each of the plurality of transport target locations 98 by traveling along the rails 99a along one or more transporting paths 99 in sequence. In the present embodiment, each transport vehicle 2 is capable of transferring an article W to and from a transfer location 98b provided at each of the plurality of transport target locations 98. For example, each of the plurality of transfer locations 98b is located at a lower height than the transport vehicles 2 which travel along the rails 99a. In addition, as shown in FIG. 1, each of the plurality of transfer locations 98b is so located to overlap with a transporting path 99 in plan view (i.e., in the top-down view).

Figure 2:
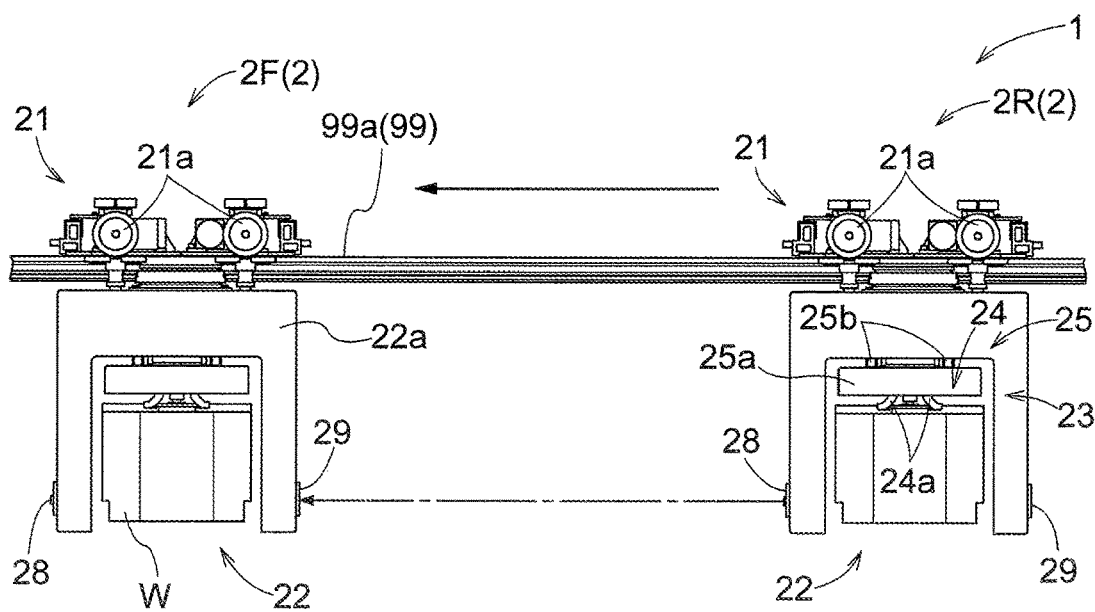
FIG. 2 is a side view of transport vehicles.
Figure 3:
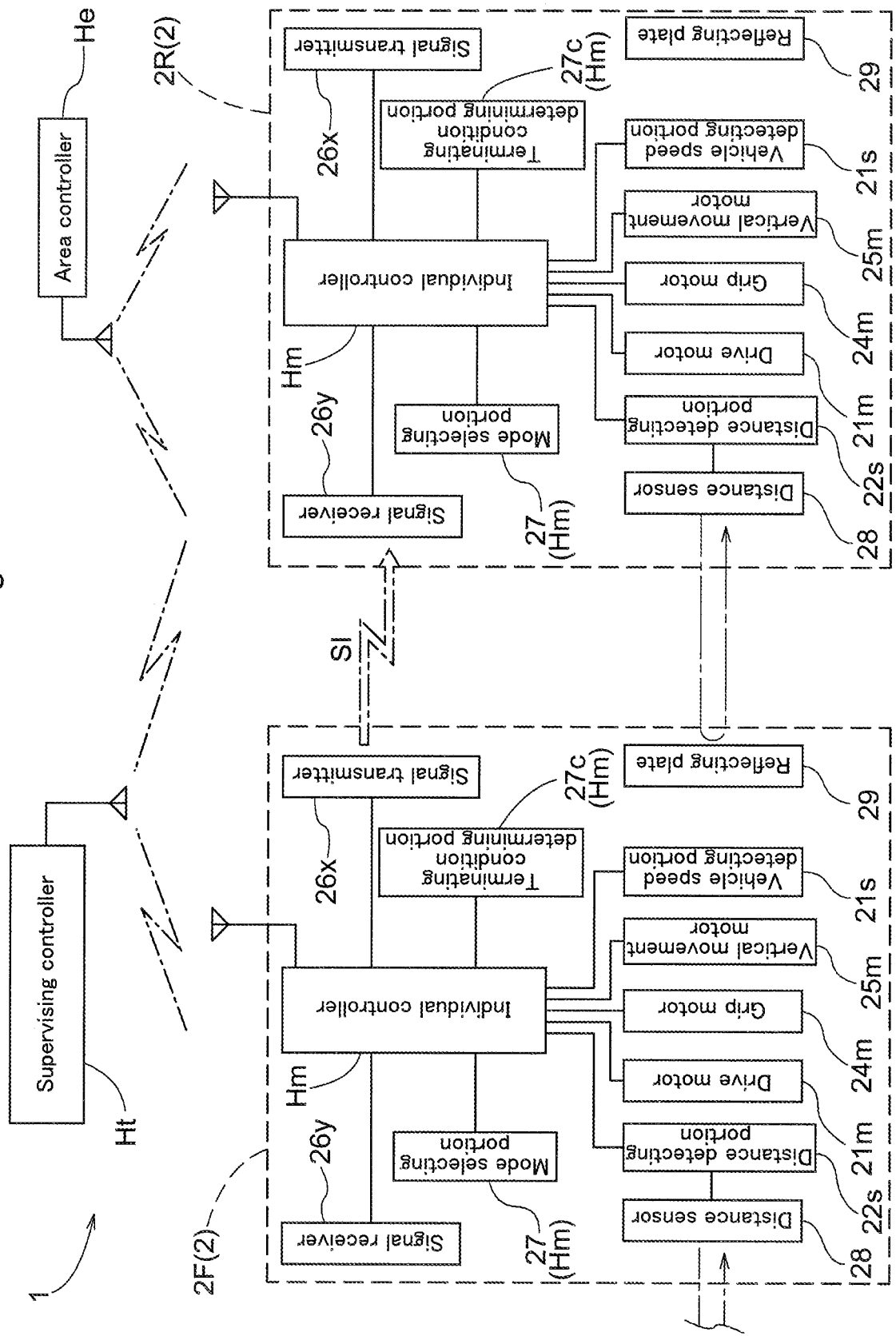
FIG. 3 is a block diagram showing a control-related arrangement.

As shown in FIG. 2, each transport vehicle 2 has a travel portion 21 configured to travel along the rails 99a. For example, the travel portion 21 may be located higher than the rails 99a. In the present example, the travel portion 21 has travel wheels 21a each of which rotates about a horizontal axis under the actuation power of a drive motor 21m (an electric motor used to provide driving power; see FIG. 3) and which rolls on the top surface of a rail 99a in a transport direction. As shown in FIG. 3, each transport vehicle 2 has a vehicle speed detecting portion 21s capable of detecting the travel speed of the transport vehicle 2. The vehicle speed detecting portion 21s is configured to be capable of detecting the speed of the transport vehicle 2 based, for example, on the number of rotations of a travel wheel 21a in a predetermined amount of time or on the relative velocity of the transport vehicle 2 with respect to the rails 99a, among other possibilities.

In addition, each transport vehicle 2 has a main body portion 22 suspended from, and supported by, the travel portion 21. The main body portion 22 is moved along the rails 99a with the travel portion 21 as the travel portion 21 travels. In the present example, the main body portion 22 has a holding portion 22a for holding an article W. And the holding portion 22a has a shape that opens downward and that also opens in both directions (referred to, hereinafter, as the path width direction) which are in the horizontal plane and perpendicular to the transport direction. More specifically, the holding portion 22a is formed in a shape of an inverted "U with right-angle corners" (or of a square bracket that opens downward) as seen along a path width direction. In the present embodiment, each transport vehicle 2 transfers an article W to and from a transfer location 98b located below the holding portion 22a.

Further, each transport vehicle 2 has a transfer device 23 configured to transfer an article W to and from a transfer location 98b. For example, the transfer device 23 is located inside the holding portion 22a. In the present example, the transfer device 23 has a grip mechanism 24 configured to grip or hold an article W, and a vertically moving mechanism 25 configured to vertically move the article W. In addition, the transfer device 23 may have, for example and among other possibilities, a turning mechanism for adjusting the orientation of the article W so that the orientation of the article W is in a proper orientation at and for a transport destination.

The grip mechanism 24 can hold an article W. For example, the grip mechanism 24 holds an article W from above. More specifically, the grip mechanism 24 holds an article W from above while it overlaps with the article W in plan or top-down view. In the present embodiment, the grip mechanism 24 has a pair of gripping claws 24a whose positions can be changed between a gripping attitude and a release attitude under the actuating power of a grip motor 24m (an electric motor used to provide power to grip or hold an article W). And the pair of gripping claws 24a is moved to the gripping attitude as the claws 24a are moved toward each other and to the release attitude as they are moved away from each other. The pair of gripping claws 24a grip or hold an article W with the claws 24a in the gripping attitude and releases the article W when they are moved to the release attitude from the gripping attitude in which the article W is held.

The vertically moving mechanism 25 is capable of vertically moving an article W. In the present embodiment, the vertically moving mechanism 25 includes a vertically movable platform 25a, a vertical movement pulleys (not shown) which are pulleys around which vertical movement belts 25b (belts used to transmit power to cause vertical movement) are spooled, and a vertical movement motor 25m (an electric motor; see FIG. 3) which drives and rotates vertical movement pulleys. And the vertically moving mechanism 25 is capable of vertically moving the vertically movable platform 25a connected to the vertical movement belts 25b as a result of the vertical movement pulleys being rotated by the vertical movement motor 25m to feed out and spool the vertical movement belts 25b. In the present example, the vertically movable platform 25a is connected to the grip mechanism 24. Thus, the vertically moving mechanism 25 is capable of vertically moving the article W gripped or held by the grip mechanism 24.

As described above, the transport system 1 is configured to allow a plurality of transport vehicles 2 to travel along transporting paths 99. Thus, in order to avoid contact between transport vehicles 2, each transport vehicle 2 has a distance detecting portion 22s (see FIG. 3) for detecting the distance (inter-vehicle distance) D to another transport vehicle 2 traveling ahead. In addition, as shown in FIG. 2, each transport vehicle 2 has a distance sensor 28 which emits light toward a reflecting plate 29 provided to the transport vehicle 2 traveling ahead. The distance sensor 28 is configured to receive the reflected light from the reflecting plate 29, and to transmit to the distance detecting portion 22s, as a detected signal, information such as the amount of time elapsed between the emitting of light and receiving of the reflected light, or the distance between the position at which the light is emitted and the position at which the reflected light is received, among other possibilities. The distance detecting portion 22s detects or obtains the inter-vehicle distance D between its own vehicle and another transport vehicle 2 traveling ahead based on the detection signal from the distance sensor 28. In addition, while not shown, each transport vehicle 2 may have an obstacle sensor for detecting any obstacle that may obstruct traveling along a transporting path 99. For example, the obstacle sensor may be configured to emit light to a predetermined detecting area and to determine that an obstacle is detected when any light reflected by the obstacle is received. When an obstacle is detected, the transport system 1 may cause the transport vehicle 2 that detected the obstacle to stop. Note that, an example is described above in which the distance sensor 28 and the obstacle sensor are optical sensors which emit and light. However, these sensors do not have to be optical sensors. Instead, the distance sensor 28 and/or the obstacle sensor may be ultrasonic sensors which emit ultrasonic sound waves.

Here, in the transport system 1, each transport vehicle 2 is configured to perform, when preset conditions are satisfied, a vehicle following control for controlling its own traveling state to maintain the inter-vehicle distance D constant between the transport vehicle 2 and another transport vehicle 2F that is traveling ahead of the transport vehicle 2. This controlling of the traveling state may be performed using any conventional control method such as a feedback control. This arrangement allows the transport efficiency of the transport system 1 as a whole to be improved where a plurality of transport vehicles 2 are allowed to travel along the same path.

Figure 4:
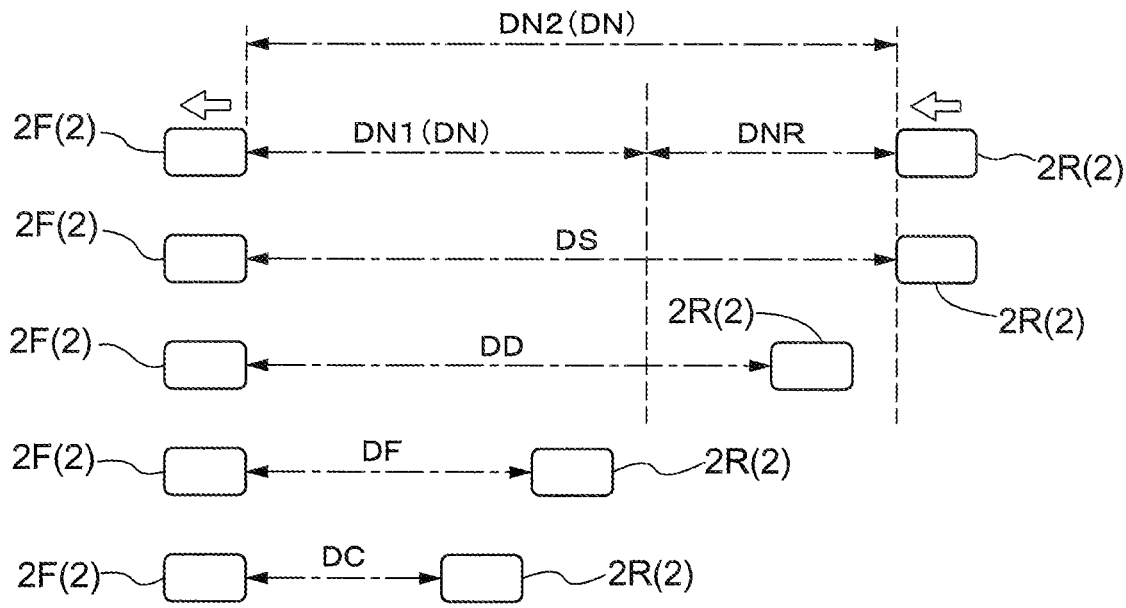
FIG. 4 is an explanatory drawing showing the inter-vehicle distances between transport vehicles.

In such a transport system 1, each of the plurality of transport vehicles 2 is configured to transmit traveling state information SI of itself (which is expressed as "traveling state information of own transport vehicle" in a claim) to a transport vehicle 2R traveling behind it (which is expressed as "behind the own transport vehicle" in a claim) and to receive traveling state information SI of a transport vehicle 2F traveling ahead of it (which is expressed as "ahead of the own transport vehicle" in a claim), from the transport vehicle 2F traveling ahead (which is expressed as "ahead of the own transport vehicle" in a claim). In the present embodiment, as shown in FIG. 3, each of the plurality of transport vehicles 2 has a signal transmitter 26x configured to transmit traveling state information SI of itself (own transport vehicle 2) to the transport vehicle 2R traveling behind it (own transport vehicle 2), and a signal receiver 26y configured to receive the traveling state information SI from the transport vehicle 2F traveling ahead of own transport vehicle. And, as shown in FIG. 4, if the inter-vehicle distance D to the transport vehicle 2F traveling ahead becomes less than or equal to a predetermined distance DD, the transport vehicle 2 performs a vehicle following control for controlling its own traveling state to maintain constant the inter-vehicle distance D to the transport vehicle 2F traveling ahead based on the traveling state information SI of the transport vehicle 2F traveling ahead. As such, in the transport system 1, the vehicle following control mentioned above is performed based on traveling state information SI of the transport vehicle 2F traveling ahead. This allows for vehicle following control with less amount of delay caused by the control (or simply control delay), compared with a case where each transport vehicle 2 follows a transport vehicle 2F traveling ahead of it (own transport vehicle 2) based on the detection result from the distance sensor 28 provided to own transport vehicle 2.

Here, the traveling state information SI includes information that is indicative of whether the transport vehicle 2 has just started to travel, has stopped, or is traveling (more specifically, traveling at a constant speed, accelerating, or decelerating). This allows the transport vehicle 2 (following transport vehicle 2R) that has received the traveling state information SI from the transport vehicle 2F traveling ahead of it to start traveling, stop traveling, or continue traveling (at a constant speed, or while accelerating, or decelerating) depending on the traveling state of the transport vehicle 2F traveling ahead. Further, in the present embodiment, traveling state information SI includes information on the travel direction at a branching location 97 (includes information indicative of the path selected for the transport vehicle 2 to take at a branching location 97. where the expression "at a branching location" modifies the verb "take"). This allows a transport vehicle 2 (transport vehicle 2R traveling behind) that has received the traveling state information SI from the transport vehicle 2F traveling ahead to learn the travel direction selected for the transport vehicle 2F traveling ahead to take at the branching location 97.

1-2. Control-Related Arrangement of Transport System

The control-related arrangement of the transport system 1 is described next with reference to FIG. 3. As shown in FIG. 3, the transport system 1 includes a supervising controller Ht which controls the transport system 1 as a whole, individual controllers Hm each of which controls corresponding one of the transport vehicles 2, and area controllers He each of which is provided at or for a branching location 97 or a merging location 96 to control a plurality of transport vehicles 2 in the corresponding branching location 97 or merging location 96. The supervising controller Ht, the individual controllers Hm, and the area controllers He are configured to be capable of communicating with one another through wire or wirelessly. Each of these controllers includes one or more processors and associated peripheral circuitry such as memory, and an interface, for example. And each function described to be performed by a controller is performed through the collaboration between such hardware and programs (algorithms) stored in memory and executable by the one or more processors, for example, of a microcomputer.

Each of a plurality of transport vehicles 2 has an individual controller Hm which controls the transport vehicle 2 to which the individual controller is provided. The supervising controller Ht controls the entire transport system 1 which includes these plurality of individual controllers Hm. Each area controller He permits or restricts entrance of a transport vehicle 2 into a branching location 97 at which a path branches away from another or a merging location 96 at which a path merges into another.

For example, when the supervising controller Ht issues a transport command to an individual controller Hm (a transport vehicle 2), a destination P (transport target location 98) is designated in accordance with the transport command. And the individual controller Hm controls the transport vehicle 2 (to which it is provided) to cause the transport vehicle 2 to move toward the destination P and then performs a control to have an article W transferred at the destination P.

In the present embodiment, each individual controller Hm (transport vehicle 2) obtains information regarding the speed of the transport vehicle 2 (own transport vehicle 2 to which the individual controller Hm is provided), whether the own transport vehicle 2 is accelerating or decelerating, based on information obtained by the vehicle speed detecting portion 21s, and an inter-vehicle distance D to a transport vehicle 2F traveling ahead as detected by the distance detecting portion 22s, and controls the drive motor 21m based on such information. In addition, each individual controller Hm (transport vehicle 2) controls: (a) the vertical movement motor 25m based on information obtained by a vertical movement amount detecting portion (not shown) which detects the amount of vertical movement (vertical movement amount) of the vertically movable platform 25a; and (b) the grip motor 24m based on information obtained by a gripping detecting portion (not shown) which detects whether an article W is gripped or held by the gripping claws 24a.

Further, in the present embodiment, each individual controller Hm (transport vehicle 2) is capable of performing a plurality of control modes, and includes a mode selecting portion 27 which selects a proper control mode for a given condition from a plurality of control modes. In the present example, each individual controller Hm (transport vehicle 2) is capable of performing, as the plurality of control modes, a vehicle following mode F for performing a vehicle following control for following a transport vehicle 2F traveling ahead, and a normal mode N for performing an autonomous travel control when the vehicle following control is not being performed.

In the normal mode N, each individual controller Hm (each transport vehicle 2) controls the traveling state of its own transport vehicle 2 (to which the individual controller Hm is provided) in accordance with a transport command from the supervising controller Ht. As shown in FIG. 4, during the traveling of a transport vehicle 2 in the normal mode N, the inter-vehicle distance D to the transport vehicle 2F traveling ahead of it is set to a normal inter-vehicle distance DN. In the present embodiment, the normal inter-vehicle distance DN is a target inter-vehicle distance between the transport vehicle 2F traveling ahead and own transport vehicle in the normal mode N (i.e., when vehicle following control is not being performed), and may have a single value. However, in the present example, the normal inter-vehicle distance DN is allowed to vary within a set distance range DNR bound by a lower limit value DN1 and an upper limit value DN2.

As shown in FIG. 4, in the present embodiment, a communication distance DS which is a distance within which communication is possible between a transport vehicle (transport vehicle 2R traveling behind) and a transport vehicle 2F traveling ahead of it. If the inter-vehicle distance D between a transport vehicle (the transport vehicle 2R traveling behind) and the transport vehicle 2F traveling ahead of it is less than, or equal to, the communication distance DS, then the signal receiver 26y of the transport vehicle 2R traveling behind can receive traveling state information SI of the transport vehicle 2F traveling ahead transmitted from the signal transmitter 26x of the transport vehicle 2F traveling ahead. In the example shown in the figure, the communication distance DS coincides with the upper limit value DN2 of the distance range DNR for the normal inter-vehicle distance DN described above. Note that the communication distance DS may take any value as long as it is greater than the lower limit value DN1 of the distance range DNR for the normal inter-vehicle distance DN.

In addition, in the present embodiment, a set distance DD is set which is a distance for the individual controller Hm (transport vehicle 2) to initiate the vehicle following mode F. If the inter-vehicle distance D between a transport vehicle (transport vehicle 2R traveling behind) and the transport vehicle 2F traveling ahead of it becomes less than, or equal to, the set distance DD, the vehicle following mode F is initiated. Note that the set distance DD is set to have a value that is within the distance range DNR for the above-described normal inter-vehicle distance DN, and that is less than the maximum value for the communication distance DS. In the present example, the set distance DD is set to be a value between the lower limit value DN1 and the upper limit value DN2 of the distance range DNR in order to ensure that the vehicle following mode F is initiated frequently. More specifically, the set distance DD is set to be the middle value of the distance range DNR (i.e., (DN1+DN2)/2).

Each individual controller Hm (thus each transport vehicle 2) in the vehicle following mode F controls the traveling state of its own transport vehicle 2 based on traveling state information SI of the transport vehicle 2F traveling ahead of it (own transport vehicle 2) to keep constant the inter-vehicle distance D to the transport vehicle 2F traveling ahead. In the vehicle following mode F, as shown in FIG. 4, a control is performed to cause the inter-vehicle distance D between a transport vehicle (transport vehicle 2R traveling behind) and a transport vehicle 2F traveling ahead of it to match a "vehicle-following inter-vehicle distance DF". In other words, the "vehicle-following inter-vehicle distance DF" is the target inter-vehicle distance for a transport vehicle (transport vehicle 2R traveling behind) and a transport vehicle 2F traveling ahead of it while the vehicle following control is being performed. And the vehicle-following inter-vehicle distance DF is set to be less than the normal inter-vehicle distance DN which is the target inter-vehicle distance when the vehicle following control is not being performed (when the normal mode N is being performed). In other words, the vehicle-following inter-vehicle distance DF is set to be less than the lower limit value DN1 of the distance range DNR of the normal inter-vehicle distance DN. In the present example, when the inter-vehicle distance D to the transport vehicle 2F traveling ahead becomes less than, or equal to, the set distance DD, the individual controller Hm (transport vehicle 2) controls its own transport vehicle to decrease the inter-vehicle distance D further to match it to the vehicle-following inter-vehicle distance DF. In addition, the individual controller Hm continues to control its own transport vehicle to maintain the inter-vehicle distance D at the vehicle-following inter-vehicle distance DF while in the vehicle following mode.

Furthermore, in the present embodiment, a terminating distance DC is set which is a distance for the individual controller Hm (transport vehicle 2) to terminate (end) the vehicle following mode F. So, the vehicle following mode F is terminated if the inter-vehicle distance D between a transport vehicle (transport vehicle 2R traveling behind) and a transport vehicle 2F traveling ahead of it becomes less than, or equal to, the terminating distance DC. Note that the terminating distance DC is set to be less than the vehicle-following inter-vehicle distance DF described above.

When the vehicle following mode F is terminated (i.e., ended), the individual controller Hm (transport vehicle 2)

returns to the normal mode N. After returning to the normal mode N from the vehicle following mode F, each individual controller Hm (thus, each transport vehicle 2) controls the traveling state of its own transport vehicle such that the inter-vehicle distance D between its own transport vehicle 2 and the transport vehicle 2F matches a normal inter-vehicle distance DN (i.e., stays within the set distance range DNR in the present example). More specifically, the individual controller Hm controls the traveling state of its own transport vehicle, based on detection signals from the distance sensor 28, to cause it to travel at a lower speed than the transport vehicle 2F traveling ahead or stop until the inter-vehicle distance D matches or becomes equal to the normal inter-vehicle distance DN. The inter-vehicle distance D between its own transport vehicle (transport vehicle 2R traveling behind) and the transport vehicle 2F traveling ahead of it may become too small due, for example, to a control delay, among other possible causes. This leads to a possibility of its own transport vehicle 2R coming into contact, from behind, with the transport vehicle 2F traveling ahead. To address this issue, in the present embodiment, if the inter-vehicle distance D becomes less than, or equal to, the terminating distance DC as a result of the inter-vehicle distance D between own transport vehicle (transport vehicle 2R traveling behind) and the transport vehicle 2F traveling ahead of it becoming too small, then the vehicle following mode F is terminated and the normal mode N is initiated. As a result, since a control is performed to cause the inter-vehicle distance D to match the normal inter-vehicle distance DN, the inter-vehicle distance D is increased at that time to cause own transport vehicle 2R to avoid contacting the vehicle 2F traveling ahead. Note that, if subsequently the inter-vehicle distance D becomes less than, or equal to, the set distance DD, the vehicle following mode F is initiated or stared again.

In the present embodiment, a plurality of terminating conditions are set as conditions for terminating the vehicle following mode F. As shown in FIG. 3, each transport vehicle 2 (each individual controller Hm) includes a terminating condition determining portion 27c for determining whether a terminating condition is satisfied. For example, as one of the terminating conditions, and as described above, the individual controller Hm (thus a transport vehicle 2) terminates the vehicle following control if the inter-vehicle distance D to the transport vehicle 2 traveling ahead becomes less than, or equal to, the set terminating distance DC which is less than the vehicle-following inter-vehicle distance DF.

In addition, as another of the terminating conditions, the individual controller Hm (thus a transport vehicle 2) terminates the vehicle following mode F (vehicle following control) if the travel direction (the path) selected for its own transport vehicle to take at a branching location 97 is determined to be different from that for the transport vehicle 2F traveling ahead of it to take at the branching location, while the vehicle following mode F (vehicle following control) is being performed. The destination P for a transport vehicle 2F traveling ahead is not necessarily the same as the destination P for a transport vehicle 2R traveling behind it because they receive commands individually from the supervising controller Ht. Therefore, the travel direction (or path) selected for the transport vehicle 2F traveling ahead to take at a branching location 97 may be different from that for the transport vehicle 2R traveling behind it to take at the branching location 97. If the selected travel directions are different, it is not proper for the following transport vehicle 2R to follow the leading transport vehicle 2F. Therefore, if the travel direction selected for the leading transport vehicle 2F to take at a branching location 97 and that for the following transport vehicle 2R are different, then the vehicle following mode F of the following transport vehicle 2R is terminated. This enables the leading transport vehicle 2F and the following transport vehicle 2R to travel along their respective optimal paths for reaching their respective destinations P.

Figure 6:
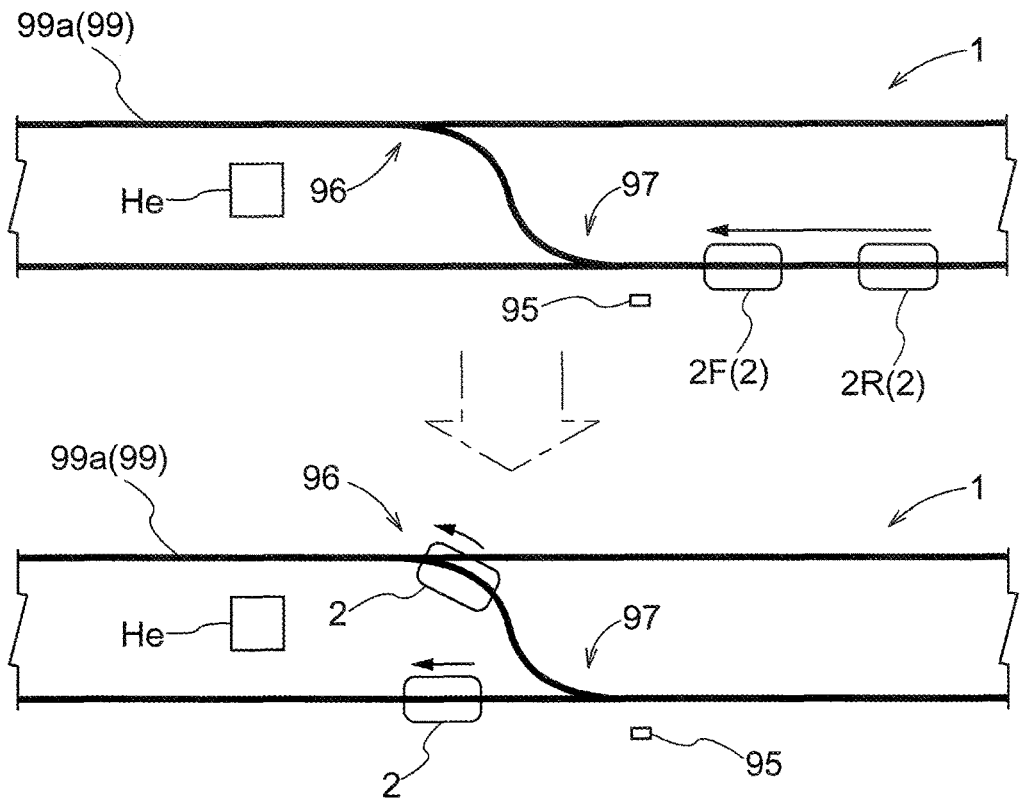
FIG. 6 is an explanatory drawing showing an example in which a vehicle following control is terminated.

In the present embodiment, the individual controller Hm (transport vehicle 2) terminates the vehicle following mode F (vehicle following control) at a specific location 95 (see FIG. 6) located before a branching location 97 (i.e., the specific location 95 is provided at such a location that the specific location 95 is reached before the branching location 97 is reached) if the travel direction (or path) at the branching location 97 located ahead in the current travel direction (and information on which is included in the traveling state information SI of the transport vehicle 2F traveling ahead) is determined to be different from the travel direction (or path) at the branching location 97, while the vehicle following mode F (vehicle following control) is being performed. As described above, a transport vehicle 2R traveling behind is capable of obtaining traveling state information SI of the transport vehicle 2F traveling ahead of it; and, the traveling state information SI includes information on the travel direction (or path) of the transport vehicle 2F traveling ahead at a branching location 97. After obtaining the information on the travel direction of the transport vehicle 2F traveling ahead at a branching location 97, the transport vehicle 2R traveling behind it compares the travel direction (or path) of the transport vehicle 2F traveling ahead and that for own transport vehicle at the branching location 97 and terminates the vehicle following mode F if these travel directions (paths) are determined to be different from each other. And the specific location 95 at which the vehicle following mode F is terminated is located before the branching location 97 as shown in FIG. 6. This makes it possible for the transport vehicle 2R traveling behind to reliably control its own movement to take the proper travel direction (or path) by the time it reaches the branching location 97.

In addition, as one of the terminating conditions, the individual controller Hm (transport vehicle 2) terminates the vehicle following mode F (vehicle following control) if preparation of its own transport vehicle for arrival at its destination P is initiated while the vehicle following mode F (vehicle following control) is being performed. As described above, the destination P for the transport vehicle 2F traveling ahead is not necessarily the same as the destination P for the transport vehicle 2R traveling behind it. And the transport vehicle 2F traveling ahead and the transport vehicle 2R traveling behind (which is in the vehicle following mode and thus is following the transport vehicle 2F traveling ahead) may reach the destination P for the transport vehicle 2R traveling behind before reaching the destination P for the transport vehicle 2F traveling ahead. In this case, it is not proper for the transport vehicle 2R traveling behind to follow the transport vehicle 2F traveling ahead of it. Therefore, the vehicle following mode F is terminated if the transport vehicle 2R traveling behind starts preparing for arrival at its destination P while the vehicle following mode F (vehicle following control) is being performed. This makes it possible for the transport vehicle 2R traveling behind to control its own movement (for example, to decelerate and stop) to prepare for arrival at its own destination P.

Figure 7:
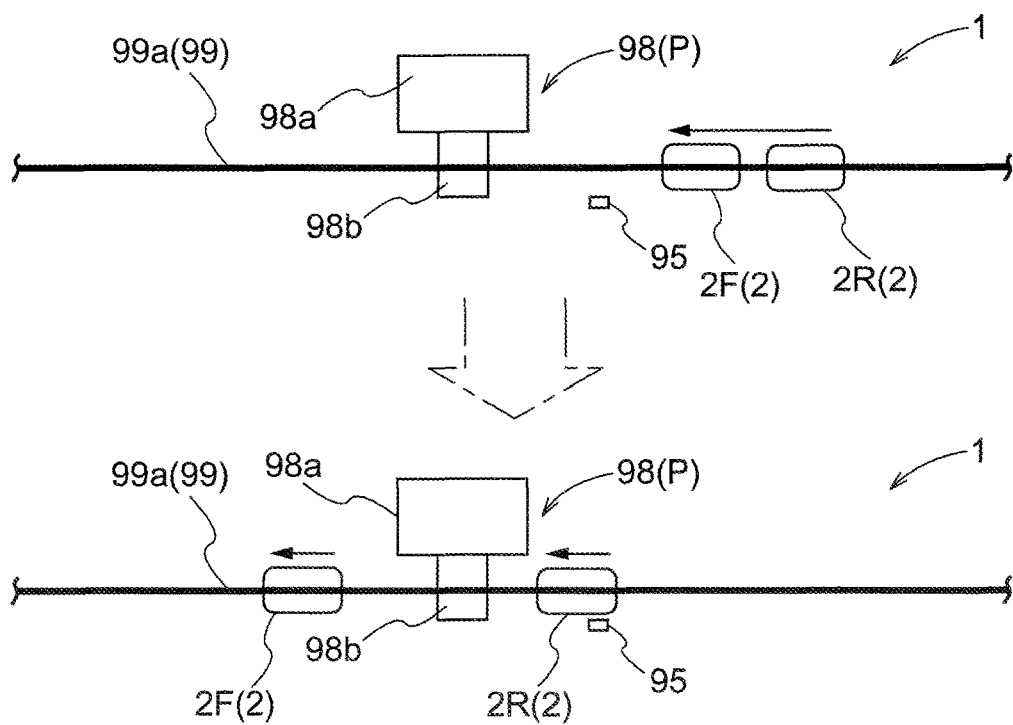
FIG. 7 is an explanatory drawing showing another example in which a vehicle following control is terminated.

In the present embodiment, the specific location 95 (an example of which is shown in FIG. 7) is located before the destination P (transport target location 98). Upon reaching the specific location 95 located before the destination P, the individual controller Hm (the transport vehicle 2R traveling behind) starts preparing for arrival at the destination P and terminates the vehicle following mode F (vehicle following control). Note that information on the destination P for the transport vehicle 2F traveling ahead may be included in its traveling state information SI that the transport vehicle 2R traveling behind obtains. If such information is included, that makes it possible for the transport vehicle 2R traveling behind to learn in advance that its own destination P is located before, with respect to the current travel direction, the destination P for the transport vehicle 2F traveling ahead. This allows the transport vehicle 2R traveling behind to more properly control its own movement to terminate the vehicle following mode F at the specific location 95.

In the present embodiment, a detected member which has a storage medium, such as a barcode, is installed at each specific location 95. In addition, each transport vehicle 2 has a detector for detecting a detected member. Information on the location of the storage medium is stored in or on the storage medium. The transport vehicle 2 is configured to be capable of learning its current location by detecting a detected member and by reading the location information in or on the storage medium. In addition, same type of detected members are also provided at other locations along the transporting paths 99 so that the transport vehicles 2 can learn their current locations by detecting these detected members even when the transport vehicles 2 are not in the areas of specific locations 95.

Figure 5:
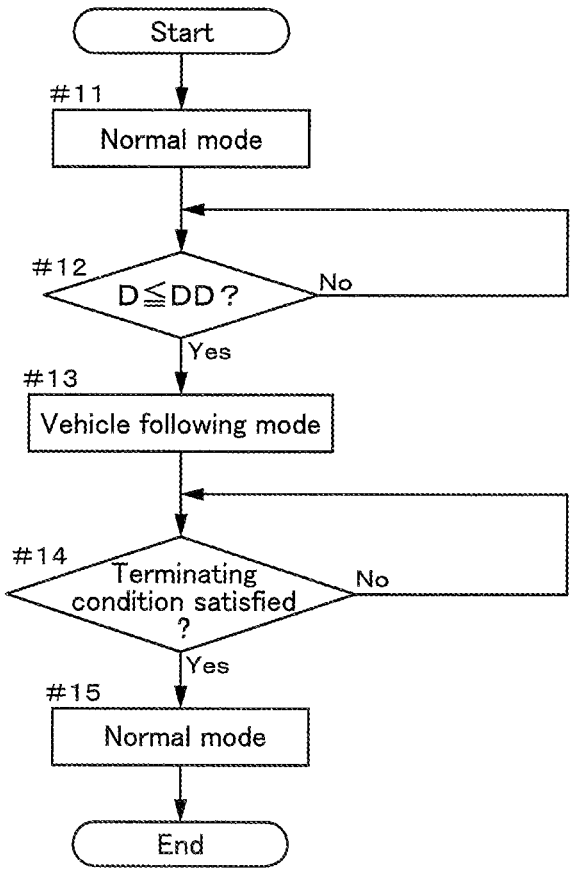
FIG. 5 is a flowchart showing the steps in a control.

The control procedure followed by each individual controller Hm (each transport vehicle 2) is described next with reference to FIG. 5. When an individual controller Hm (transport vehicle 2) causes its own transport vehicle to travel in response to a command (for example, a transport command) from the supervising controller Ht, the normal mode N is selected by the mode selecting portion 27 to start with so that the individual controller Hm controls the traveling state of own transport vehicle (transport vehicle 2) in the normal mode N (Step #11). In the normal mode N, the individual controller Hm controls its own transport vehicle such that the inter-vehicle distance D between its own transport vehicle 2 and a transport vehicle 2F traveling ahead of it matches the normal inter-vehicle distance DN (stays within the distance range DNR).

The individual controller Hm (transport vehicle 2) determines whether the inter-vehicle distance D to the transport vehicle 2F traveling ahead has become less than, or equal to, the set distance DD while the normal mode N is being performed (Step #12). And if it is determined that the inter-vehicle distance D has become less than, or equal to, the set distance DD ("Yes" at Step #12), the vehicle following mode F is selected by the mode selecting portion 27 so that the individual controller Hm (transport vehicle 2) controls the traveling state of its own transport vehicle 2 in the vehicle following mode F (Step #13). In the vehicle following mode F, the individual controller Hm controls its own transport vehicle 2 such that the inter-vehicle distance D of its own transport vehicle (transport vehicle 2) and a transport vehicle 2F traveling ahead matches the vehicle-following inter-vehicle distance DF.

The individual controller Hm (transport vehicle 2) determines whether a terminating condition for terminating the vehicle following mode F (vehicle following control) is satisfied while the vehicle following mode F (vehicle following control) is being performed (Step #14). More specifically, the determination of whether a terminating condition is satisfied is performed by a terminating condition determining portion 27c (see FIG. 3). As described above, the terminating condition determining portion 27c determines that a terminating condition is satisfied (a) if the inter-vehicle distance D to the transport vehicle 2F traveling ahead becomes less than, or equal to, a specified terminating distance DC that is set to be less than the vehicle-following inter-vehicle distance DF, or (b) if the travel direction (path) selected for its own transport vehicle to take at a branching location 97 is different from that for the transport vehicle 2F traveling ahead, or (c) if preparation for arrival at the destination P of its own transport vehicle 2 is initiated (more specifically, when own transport vehicle 2 reaches the specific location 95 located before the destination P).

If the individual controller Hm (transport vehicle 2) determines that any of the terminating conditions is satisfied while the vehicle following mode F is being performed ("Yes" at Step #14), the individual controller Hm (transport vehicle 2) terminates or ends the vehicle following mode F; and, the normal mode N is selected by the mode selecting portion 27 (step #15). This causes the transport vehicle 2 to be controlled such that the inter-vehicle distance D to transport vehicle 2F traveling ahead matches the normal inter-vehicle distance DN, thus increasing the inter-vehicle distance D at that time. Subsequently, the vehicle following mode F is initiated again if the inter-vehicle distance D becomes less than, or equal to, the set distance DD.

How a plurality of transport vehicles 2 are controlled by an area controller He is described next. As described above, each area controller He permits or restricts entrance of a transport vehicle 2 into a branching location 97 at which a path branches away from another or a merging location 96 at which a path merges into another (In this context, the word "restrict" is used to mean that the transport vehicle 2 that is the subject of the restriction is not allowed to enter the branching location 97 or the merging location 96 unless one or more conditions are satisfied). In the present embodiment, as one specific example, when a transport vehicle 2R traveling behind (the first transport vehicle) that is performing the vehicle following mode F (vehicle following control) which is causing the transport vehicle 2R traveling behind (the first transport vehicle) to follow a transport vehicle 2F traveling ahead (the second transport vehicle) through a merging location 96, an area controller 113 prevents any other transport vehicle 2 that is neither the transport vehicle 2R traveling behind (the first transport vehicle) nor the transport vehicle 2F traveling ahead (the second transport vehicle) from entering the merging location 96 between the transport vehicle 2F traveling ahead (the second transport vehicle) and the transport vehicle 2R traveling behind (the first transport vehicle).

Each area controller He basically preferentially allows the transport vehicle 2 that reaches the corresponding merging location 96 before other transport vehicles 2 to travel through the merging location 96 before the others. However, if the transport vehicles 2 that are controlled by an area controller He include members of transport vehicles 2 that form a transport vehicle train 20 formed by a plurality of transport vehicles 2 involved in the vehicle following mode F, the area controller He performs a control in which any other transport vehicle 2 that is not any of the members of the transport vehicle train 20 is prevented from entering the merging location 96 between any two members of the transport vehicle train 20. Here, "a transport vehicle train 20 formed by a plurality of transport vehicles 2 involved in the vehicle following mode F" means a plurality of transport vehicles 2 each of which (except for the one leading the transport vehicle train 20) is controlled by its individual controller Hm in the vehicle following mode F and is so following the transport vehicle 2 traveling ahead of it. For example, a transport vehicle 2 which is traveling along a path 99 that is different from a path 99 that the transport vehicle train 20 is traveling along may be traveling in such a manner as to cause the transport vehicle 2 to reach a merging location 96 for these two paths 99 after the lead transport vehicle 2H that is at the lead of the transport vehicle train 20 reaches the merging location 96 and before the last transport vehicle 2 (a transport vehicle 2R traveling behind other(s)) traveling at the trailing end of the transport vehicle train 20 reaches the merging location 96. In such a case, if the area controller He was performing a control which allows the transport vehicle 2 that reaches the merging location 96 before other transport vehicles 2 to travel through the merging location 96 before the others, then, the transport vehicle that is not a member of the transport vehicle train 20 would be allowed to enter the merging location 96 between two members of the transport vehicle train 20. If this happens, the vehicle following control for the transport vehicle(s) in the transport vehicle train 20 that end up traveling behind the transport vehicle that is not a member of the transport vehicle train 20 may be suspended, which results in increased inter-vehicle distance(s) D, which in turn lowers the transport efficiency of the transport system as a whole. To address this issue, in the present embodiment, when an area controller He is controlling the members of a transport vehicle train 20 as well as a transport vehicle that is not a member of a transport vehicle train 20 such that the transport vehicle that is not a member of a transport vehicle train 20 is not allowed to enter an merging location 96 between any two members of the transport vehicle train 20, and if the lead transport vehicle 2H which is traveling at the lead of the transport vehicle train 20 reaches the merging location 96 before the transport vehicle 2 that is not a member of the transport vehicle train 20, then the area controller He controls all these travel vehicles 2 such as to cause the transport vehicle that is not a member of the transport vehicle train 20 to enter the merging location 96 after the last transport vehicle 2 (transport vehicle 2R traveling behind other member(s)) traveling at the trailing end of the transport vehicle train 20 traveled through the merging location 96.

Figure 8:
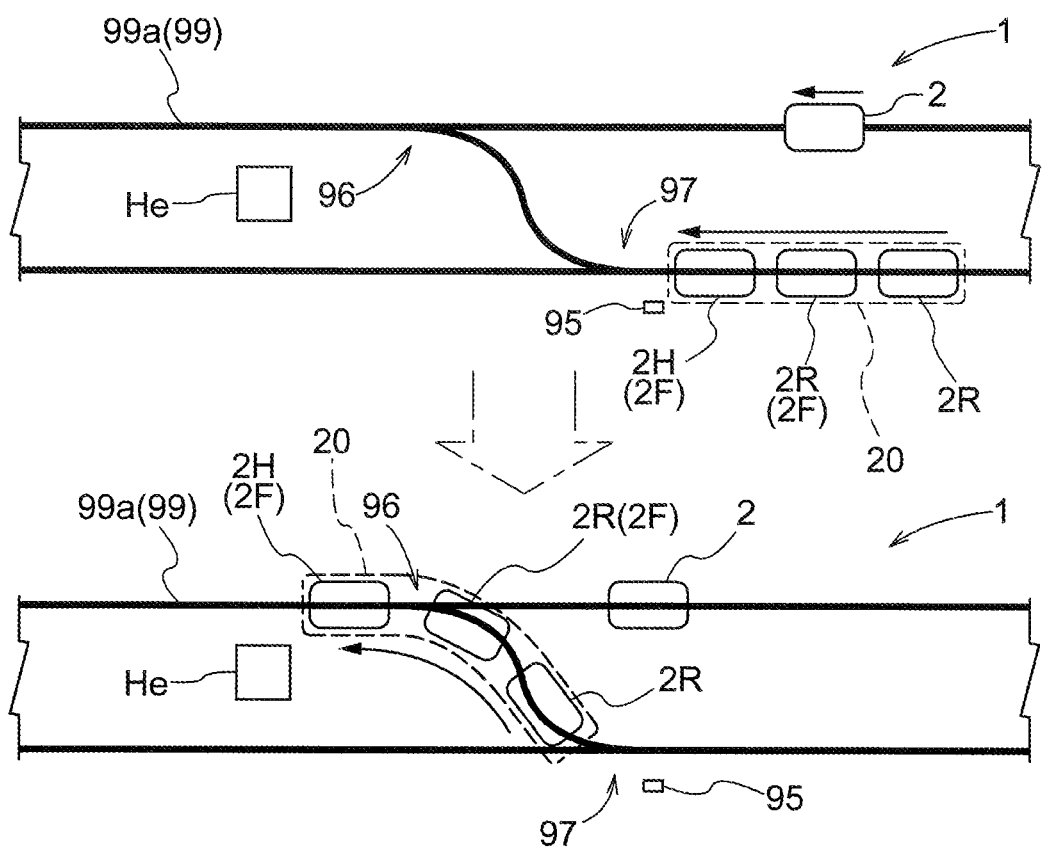
FIG. 8 is a drawing to illustrate an example of a control performed at a merging location.

FIG. 8 shows a transport vehicle train 20 formed by three transport vehicles 2 which are involved in the vehicle following mode F, and one transport vehicle 2 (referred to as the non-member transport vehicle 2) that is not a member of the transport vehicle train 20 with the transport vehicle train 20 traveling along one path 99 and the non-member transport vehicle 2 traveling along another path 99. In the example shown in FIG. 8, the non-member transport vehicle 2 which is traveling along the path 99 that is different from the path 99 that the transport vehicle train 20 is traveling along is traveling in such a manner as to cause the non-member transport vehicle 2 to reach the merging location 96 after the lead transport vehicle 2H that is at the lead of the transport vehicle train 20 reaches the merging location 96 and before the last transport vehicle 2 (the transport vehicle 2R traveling behind others) traveling at the trailing end of the transport vehicle train 20 reaches the merging location 96. In such a case, the area controller He restricts the entrance of the non-member transport vehicle 2 into the merging location 96 and allows the transport vehicle train 20 to travel through the merging location 96 before the non-member transport vehicle 2. For example, the area controller He commands (by sending a command signal) the individual controller Hm of the non-member transport vehicle 2 to stop (or decelerate) the non-member transport vehicle 2 before reaching the merging location 96. And the area controller He commands the individual controller Hm of the non-member transport vehicle 2 to cause the non-member transport vehicle 2 to resume traveling after the transport vehicle train 20 has traveled through the merging location 96. This arrangement can prevent the non-member transport vehicle 2 from entering the merging location 96 between any two of the plurality of transport vehicles 2 that form the transport vehicle train 20. Note that, if the non-member transport vehicle 2 is traveling in such a manner as to cause it to reach the merging location 96 before the lead transport vehicle 2H of the transport vehicle train 20 reaches the merging location 96, then the area controller He causes the non-member transport vehicle 2 to enter the merging location 96 before the transport vehicle train 20 enters the merging location 96. In addition, it is preferable that, if the non-member transport vehicle 2 is traveling in such a manner as to cause it to reach the merging location 96 at the same time the transport vehicle train 20 reaches the merging location 96, then the area controller He allow one of the non-member transport vehicle 2 and the transport vehicle train 20 that has a higher priority for transporting operation (or higher transporting priority) to enter the merging location 96 before the other, although the invention is not limited to such arrangement, and the transport vehicle train 20, for example, may always be given priority to travel through a merging location 96.

In addition, in the present embodiment, an upper limit is set for the number of transport vehicles 2 one following another with each performing the vehicle following mode F (vehicle following control) and thus following a transport vehicle 2 traveling ahead and with one of the transport vehicles is following a lead transport vehicle 2H not performing the vehicle following mode F (vehicle following control). As described above, the vehicle following control is one in which a transport vehicle 2 is controlled based on traveling state information SI after receiving the traveling state information SI of the transport vehicle 2F traveling ahead. Therefore, there is a slight lag for the transport vehicle 2R traveling behind in controlling its own movement due to a control delay, relative to the transport vehicle 2 traveling ahead of it. Therefore, if the lead transport vehicle 2H comes to a stop (i.e., stops) while a plurality of transport vehicles 2 are traveling with each following another as a result of performing the vehicle following mode F, the amount SD by which the inter-vehicle distance D to a transport vehicle 2 traveling ahead is decreased after the lead transport vehicle 2H comes to a stop due to a control delay accumulates and becomes greater for transport vehicles that are farther behind from the lead transport vehicle 211. In such a case, a transport vehicle 2 would come into contact with the transport vehicle 2 traveling ahead if the accumulated amount SD by which the inter-vehicle distance D to a transport vehicle 2 traveling ahead is decreased becomes equal to the vehicle-following inter-vehicle distance DF which is the inter-vehicle distance D during the vehicle following mode F.

Figure 9:
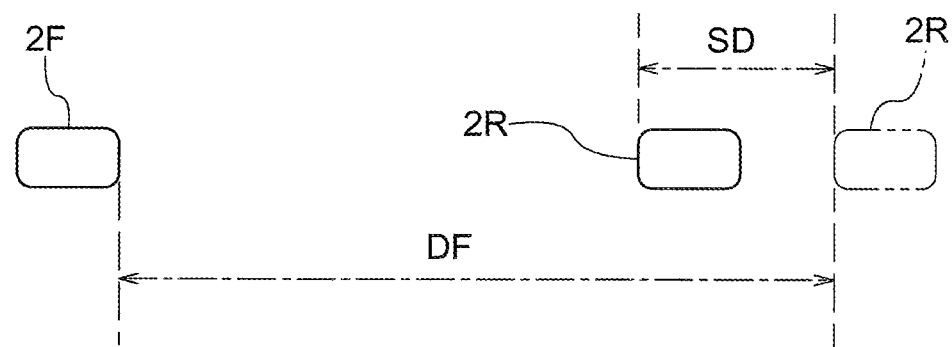
FIG. 9 shows when transport vehicles come to a stop while performing a vehicle following control.

To address this issue, as shown in FIG. 9, in the present embodiment, an upper limit for the number of transport vehicles 2 one following another with each following another as a result of performing the vehicle following mode F (vehicle following control) is set such that, when the lead transport vehicle 2H comes to a stop, the amount SD (the maximum amount SD) by which the inter-vehicle distance D to a transport vehicle 2 traveling ahead is decreased after the lead transport vehicle 2H comes to a stop and which accumulates and becomes greater for transport vehicles that are farther behind from the lead transport vehicle 2H and the lead transport vehicle 2H due to a control delay of each transport vehicle 2R following a transport vehicle traveling ahead is less than the target inter-vehicle distance (vehicle-following inter-vehicle distance DF) set for the vehicle following mode F (vehicle following control). This arrangement improves the possibility for a transport vehicle 2R traveling behind to be prevented from coming into contact, from behind, with the transport vehicle 2F traveling ahead (i.e., to prevent contact between the transport vehicles 2). For example, if the vehicle-following inter-vehicle distance DF is 3 meters, the mount SD per one transport vehicle 2 by which the inter-vehicle distance D to a transport vehicle 2 traveling ahead is decreased after the lead transport vehicle 2 comes to a stop due to a control delay is 30 cm, and the number of the transport vehicles 2 that are performing the vehicle following mode F (vehicle following control) is ten or greater, then the tenth transport vehicle 2 may come into contact, from behind, with the transport vehicle 2F traveling ahead because the accumulated amount SD by which the inter-vehicle distance D to the ninth transport vehicle 2 is decreased after the lead transport vehicle comes to a stop is equal to the vehicle-following inter-vehicle distance DF. Therefore, under such conditions, it is preferable to set the upper limit for the number of such transport vehicles 2 to be nine or less so that the accumulated amount SD by which the inter-vehicle distance D to a transport vehicle 2 traveling ahead is decreased after the lead transport vehicle 2H comes to a stop is less than the vehicle-following inter-vehicle distance DF (3 meters). As in the example above, the upper limit is preferably set depending on, among other possibilities, the travel speed of the transport vehicles 2 that perform the vehicle following mode F (vehicle following control) and/or on the amount of control day that occurs in each transport vehicle 2.

2. Other Embodiments

Other embodiments of a transport system are described next.

(1) In the description above, an example is described in which each transport vehicle 2 is a ceiling, or overhead, transport vehicle configured to travel along rails 99a provided parallel to the ceiling surface. However, the present invention is not limited to such an example. The transport vehicles 2 may, for example, be unmanned transport vehicles that travel on the floor surface, among other possibilities. In such cases, the unmanned transport vehicles that travel on the floor may travel along one or more rails, or alternatively along a path indicated for example by a magnetic tape provided to the floor surface in place of the one or more rails.

(2) In the description above, an example is described in which an area controller Hc performs a control that prevents a transport vehicle 2, that is traveling along a path that is different from the path along which a transport vehicle train 20 is traveling, from entering a merging location 96 between any two of the plurality of transport vehicles 2 that form the transport vehicle train 20. However, the present invention is not limited to such an example. For example, an area controller Hc may be configured to allow a transport vehicle 2 (non-member transport vehicle 2) that is not a member of the transport vehicle train 20 to enter a merging location 96 between two of the plurality of transport vehicles 2 that form the transport vehicle train 20 when necessary, because, for example, of a relative priority or importance for transporting operations between the plurality of transport vehicles 2 that form the transport vehicle train 20 and the non-member transport vehicle 2.

(3) In the description above, an example is described in which, if the inter-vehicle distance D between a transport vehicle 2F and the transport vehicle 2R traveling behind it becomes less than, or equal to, the terminating distance DC, then the vehicle following mode F is terminated (i.e., ended) and the normal mode N is initiated for the transport vehicle traveling behind 2R. However, the present invention is not limited to such an example. A transport vehicle 2R (more specifically, its individual controller Hm) may be configured to control its own system such that, if the inter-vehicle distance D to the transport vehicle 2F becomes less than, or equal to, the terminating distance DC, then it continues to operate in the vehicle following mode F but temporarily reduces its speed to a speed lower than the transport vehicle 2F traveling ahead until the inter-vehicle distance D to the transport vehicle 2F traveling ahead matches the vehicle-following inter-vehicle distance DF.

(4) In the description above, an example is described in which, in consideration of control delays, an upper limit is set for the number of transport vehicles 2 each following another as a result of performing the vehicle following control. However, the present invention is not limited to such an example. If the control delays are very small, or for other reason, an upper limit does not have to be set for the number of transport vehicles 2 each following another as a result of performing the vehicle following control.

(5) Note that an arrangement disclosed in any of the embodiments described above can also be used in combination with any arrangement disclosed in any other embodiment unless inconsistency arises. Regarding any other arrangements and features, the embodiments disclosed in the present description are provided for the purposes of illustration only regarding all aspects. Therefore, it is possible to make various suitable changes without departing from the spirit of the present disclosure.

3. Summary of Embodiments Described Above

A brief summary of the transport system described above is provided next.

In one embodiment, a transport system comprises: a plurality of transport vehicles configured to travel along one or more transport paths which include one or more branching locations and one or more merging locations, wherein each of the plurality of transport vehicles is configured to:
  travel along at least one of the one or more transport paths toward a designated destination;
  transmit traveling state information of own transport vehicle to a transport vehicle that is traveling behind the own transport vehicle and to receive traveling state information of a transport vehicle that is traveling ahead of the own transport vehicle, from the transport vehicle traveling ahead;
  perform a vehicle following control if an inter-vehicle distance to the transport vehicle traveling ahead of the own transport vehicle becomes less than or equal to a predetermined distance, the vehicle following control being a control in which traveling state of the own transport vehicle is controlled in order to maintain constant the inter-vehicle distance to the transport vehicle traveling ahead based on traveling state information of the transport vehicle traveling ahead, and terminate the vehicle following control
- if preparation of the own transport vehicle for arrival at a destination is initiated while the vehicle following control is being performed or
- if a travel direction of the own transport vehicle at a branching location is determined to be different from a travel direction of the transport vehicle traveling ahead at the branching location while the vehicle following control is being performed.

With such an arrangement, because each transport vehicle performs the vehicle following control based on the traveling state information received from the transport vehicle traveling ahead, it can follow the transport vehicle traveling ahead with a relatively small amount of control delay. Thus, the inter-vehicle distance to the transport vehicle traveling ahead can be made shorter than normal while avoiding any contact with the transport vehicle traveling ahead, thus making it possible to improve transport efficiency of the transport system as a whole. In addition, with the arrangement described above, each transport vehicle is configured to perform a vehicle following control if an inter-vehicle distance to the transport vehicle traveling ahead of the own transport vehicle becomes less than or equal to a predetermined distance, and to terminate the vehicle following control if preparation of the own transport vehicle for arrival at its own destination is initiated or if a travel direction of the own transport vehicle at a branching location is different from a travel direction of the transport vehicle traveling ahead at the branching location. Therefore, with the arrangement described above, autonomous traveling of each transport vehicle is allowed to efficiently transport an article, however, when a transport vehicle comes close to a transport vehicle traveling ahead in a travel direction, the inter-vehicle distance is maintained relatively short by performing the vehicle following control, which makes it possible to improve transport efficiency in situations where a plurality of transport vehicles are allowed to travel along the same path. Thus, such an arrangement makes it possible to improve transport efficiency of the transport system as a whole while avoiding a transport vehicle making any contact with a transport vehicle traveling ahead.

Here, the traveling state information preferably includes information on a travel direction at a branching location, wherein each of the plurality of transport vehicles is preferably configured to terminate the vehicle following control at a specific location located before a branching location if a travel direction of a transport vehicle traveling ahead of own transport vehicle at the branching location located ahead in a current travel direction and information on which is included in the traveling state information of the transport vehicle traveling ahead is determined to be different from a travel direction of the own transport vehicle at the branching location, while the vehicle following control is being performed.

With such an arrangement, the vehicle following control is terminated at a specific location located before a branching location (i.e., the specific location is so located that it is reached before the branching location is reached) if information that is on a travel direction selected for a transport vehicle traveling ahead of own transport vehicle to take at the branching location located ahead in a current travel direction and that is included in the traveling state information of the transport vehicle traveling ahead is different from a travel direction selected for the own transport vehicle to take at the branching location. This makes it possible for the transport vehicle traveling behind to reliably control its own movement to take the proper travel direction (or path) by the time it reaches the branching location.

In addition, it is preferable that, when the transport vehicle traveling behind, that is performing the vehicle following control which causes the transport vehicle traveling behind to follow the transport vehicle traveling ahead, travels through a merging location, any other transport vehicle that is neither the transport vehicle traveling behind nor the transport vehicle traveling ahead is prevented from entering the merging location between the transport vehicle traveling ahead and the transport vehicle traveling behind.

With such an arrangement, any other transport vehicle that is neither the transport vehicle traveling behind while the vehicle following control (first transport vehicle) or the transport vehicle (second transport vehicle) traveling ahead while the vehicle following control of it is prevented from entering the merging location between them, which prevents the vehicle following control from being suspended as a result of the other transport vehicle entering the merging location between them. This arrangement makes it possible to further improve the transport efficiency of the transport system as a whole.

Also, a vehicle-following inter-vehicle distance which is a target inter-vehicle distance to a transport vehicle traveling ahead while the vehicle following control is being performed is preferably set to be less than a normal inter-vehicle distance which is a target inter-vehicle distance while the vehicle following control is not being performed, and wherein each of the plurality of transport vehicles is preferably configured to terminate the vehicle following control if an inter-vehicle distance to a transport vehicle traveling ahead of own transport vehicle becomes less than or equal to a terminating distance which is set to be less than the vehicle-following inter-vehicle distance.

With such an arrangement, while the vehicle following control is being performed, the inter-vehicle distance (the vehicle-following inter-vehicle distance) to a transport vehicle traveling ahead is made less than the normal inter-vehicle distance, which makes it possible to improve the transport efficiency of the transport system as a whole. In addition, the terminating distance is set that is less than the vehicle-following inter-vehicle distance so that, if the inter-vehicle distance between a transport vehicle and the transport vehicle traveling ahead of it becomes too small due, for example, to a control delay, among other possible causes, the inter-vehicle distance D to the transport vehicle traveling ahead is increased at that time. This improves the possibility of a transport vehicle's ability to avoid any contact with the transport vehicle traveling ahead.

In addition, an upper limit is preferably set for the number of transport vehicles one following another with each performing the vehicle following control and thus following a transport vehicle traveling ahead and with one of the transport vehicles following a lead transport vehicle not performing the vehicle following control, wherein the upper limit is set such that, when the lead transport vehicle comes to a stop, an amount by which an inter-vehicle distance to a transport vehicle traveling ahead is decreased after the lead transport vehicle comes to a stop and which accumulates and becomes greater for transport vehicles that are farther behind from the lead transport vehicle due to a control delay in each of the transport vehicles performing the vehicle following control is less than a target inter-vehicle distance set for the vehicle following control.

When the lead transport vehicle comes to a stop, the inter-vehicle distance between the lead transport vehicle and the transport vehicle traveling behind it is often shortened after the lead transport vehicle comes to a stop because of a control delay relative to the inter-vehicle distance while the transport vehicles are traveling. Therefore, if a plurality of transport vehicles are traveling with each (except for the lead transport vehicle) following another as a result of performing the vehicle following mode, the amount by which the inter-vehicle distance to a transport vehicle traveling ahead is decreased after the lead transport vehicle comes to a stop accumulates and becomes greater for transport vehicles that are farther behind from the lead transport vehicle. In such a case, a transport vehicle would come into contact with the transport vehicle traveling ahead if the accumulated amount by which the inter-vehicle distance to the transport vehicle traveling ahead is decreased becomes equal to the inter-vehicle distance during the vehicle following mode. However, with the arrangement described above, the upper limit is set such that the amount by which the inter-vehicle distance between the transport vehicle at the trailing end and the transport vehicle traveling ahead of it is decreased after the lead transport vehicle comes to a stop is less than the target inter-vehicle distance set for the vehicle following control. This can help further improve the possibility of a transport vehicle's ability to avoid any contact with the transport vehicle traveling ahead.

What is claimed is:

1. A transport system comprising:
   a plurality of transport vehicles configured to travel along one or more transport paths which include one or more branching locations and one or more merging locations;
   a supervising controller which controls the transport system as a whole; and
   a plurality of area controllers each of which are provided at a branching location or a merging location to control a plurality of transport vehicles in the corresponding branching location or merging location,
   wherein the transport paths are set by way of a plurality of transport target locations,
   wherein each of the plurality of transport vehicles is configured to: travel along at least one of the one or more transport paths toward a transport target location as a designated destination set by the supervising controller, performing an autonomous travel control;
   transfer an article to and from a transfer location provided at each of the plurality of transport target locations;
   transmit traveling state information of own transport vehicle to a transport vehicle that is traveling behind the own transport vehicle and to receive traveling state information of a transport vehicle that is traveling ahead of the own transport vehicle, from the transport vehicle traveling ahead;
   perform a vehicle following control if an inter-vehicle distance to the transport vehicle traveling ahead of the own transport vehicle becomes less than or equal to a predetermined distance, the vehicle following control being a control in which traveling state of the own transport vehicle is controlled in order to maintain constant the inter-vehicle distance to the transport vehicle traveling ahead based on traveling state information of the transport vehicle traveling ahead;
   terminate the vehicle following control
      if preparation of the own transport vehicle for arrival at a destination is initiated while the vehicle following control is being performed or
      if a travel direction of the own transport vehicle at a branching location is determined to be different from a travel direction of the transport vehicle traveling ahead at the branching location, while the vehicle following control is being performed; and
   the area controllers each limit entry, into a respective merging location, of any other transport vehicle that is neither the transport vehicle traveling behind nor the transport vehicle traveling ahead such that when the transport vehicle traveling behind, that is performing the vehicle following control which causes the transport vehicle traveling behind to follow the transport vehicle traveling ahead, travels through the merging location, the any other transport vehicle is prevented from entering the merging location between the transport vehicle traveling ahead and the transport vehicle traveling behind.

2. The transport system as defined in claim 1, wherein the traveling state information includes information on a travel direction at a branching location,
   wherein each of the plurality of transport vehicles is configured to terminate the vehicle following control at a specific location located before a branching location if a travel direction of a transport vehicle traveling ahead of own transport vehicle at the branching location located ahead in a current travel direction and information on which is included in the traveling state information of the transport vehicle traveling ahead is determined to be different from a travel direction of the own transport vehicle at the branching location, while the vehicle following control is being performed.

3. The transport system as defined in claim 1, wherein a vehicle-following inter-vehicle distance which is a target inter-vehicle distance to a transport vehicle traveling ahead while the vehicle following control is being performed is set to be less than a normal inter-vehicle distance which is a target inter-vehicle distance while the vehicle following control is not being performed, and
   wherein each of the plurality of transport vehicles is configured to terminate the vehicle following control if an inter-vehicle distance to a transport vehicle traveling ahead of own transport vehicle becomes less than or equal to a terminating distance which is set to be less than the vehicle-following inter-vehicle distance.

4. The transport system as defined in claim 2, wherein a vehicle-following inter-vehicle distance which is a target inter-vehicle distance to a transport vehicle traveling ahead while the vehicle following control is being performed is set to be less than a normal inter-vehicle distance which is a target inter-vehicle distance while the vehicle following control is not being performed, and
   wherein each of the plurality of transport vehicles is configured to terminate the vehicle following control if an inter-vehicle distance to a transport vehicle traveling ahead of own transport vehicle becomes less than or equal to a terminating distance which is set to be less than the vehicle-following inter-vehicle distance.

5. The transport system as defined in claim 1, wherein an upper limit is set for the number of transport vehicles one following another with each performing the vehicle following control and thus following a transport vehicle traveling ahead and with one of the transport vehicles following a lead transport vehicle not performing the vehicle following control, wherein the upper limit is set such that, when the lead transport vehicle comes to a stop, an amount by which an inter-vehicle distance to a transport vehicle traveling ahead is decreased after the lead transport vehicle comes to a stop and which accumulates and becomes greater for transport vehicles that are farther behind from the lead transport vehicle due to a control delay in each of the transport vehicles performing the vehicle following control is less than a target inter-vehicle distance set for the vehicle following control.

6. The transport system as defined in claim 2, wherein an upper limit is set for the number of transport vehicles one following another with each performing the vehicle following control and thus following a transport vehicle traveling ahead and with one of the transport vehicles following a lead transport vehicle not performing the vehicle following control, wherein the upper limit is set such that, when the lead transport vehicle comes to a stop, an amount by which an inter-vehicle distance to a transport vehicle traveling ahead is decreased after the lead transport vehicle comes to a stop and which accumulates and becomes greater for transport vehicles that are farther behind from the lead transport vehicle due to a control delay in each of the transport vehicles performing the vehicle following control is less than a target inter-vehicle distance set for the vehicle following control.

7. The transport system as defined in claim 3, wherein an upper limit is set for the number of transport vehicles one following another with each performing the vehicle following control and thus following a transport vehicle traveling ahead and with one of the transport vehicles following a lead transport vehicle not performing the vehicle following control, wherein the upper limit is set such that, when the lead transport vehicle comes to a stop, an amount by which an inter-vehicle distance to a transport vehicle traveling ahead is decreased after the lead transport vehicle comes to a stop and which accumulates and becomes greater for transport vehicles that are farther behind from the lead transport vehicle due to a control delay in each of the transport vehicles performing the vehicle following control is less than a target inter-vehicle distance set for the vehicle following control.

8. The transport system as defined in claim 4, wherein an upper limit is set for the number of transport vehicles one following another with each performing the vehicle following control and thus following a transport vehicle traveling ahead and with one of the transport vehicles following a lead transport vehicle not performing the vehicle following control, wherein the upper limit is set such that, when the lead transport vehicle comes to a stop, an amount by which an inter-vehicle distance to a transport vehicle traveling ahead is decreased after the lead transport vehicle comes to a stop and which accumulates and becomes greater for transport vehicles that are farther behind from the lead transport vehicle due to a control delay in each of the transport vehicles performing the vehicle following control is less than a target inter-vehicle distance set for the vehicle following control.

* * * * *